(12) United States Patent
Hsiao et al.

(10) Patent No.: US 11,281,516 B2
(45) Date of Patent: Mar. 22, 2022

(54) ERROR HANDLING METHOD AND ASSOCIATED ERROR HANDLING ARCHITECTURE FOR TRANSMISSION INTERFACES

(71) Applicant: Realtek Semiconductor Corp., HsinChu (TW)

(72) Inventors: Cheng-Yuan Hsiao, Taichung (TW); Sung-Kao Liu, Hsinchu (TW); Yi-Ting Chien, Hsinchu County (TW); Wei-Hung Chuang, Taichung (TW); Chih-Yu Hsu, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 48 days.

(21) Appl. No.: 16/711,440

(22) Filed: Dec. 12, 2019

(65) Prior Publication Data

US 2020/0379833 A1    Dec. 3, 2020

(30) Foreign Application Priority Data

Jun. 3, 2019    (TW) .................................. 108119217

(51) Int. Cl.
*G06F 11/00*    (2006.01)
*G06F 11/07*    (2006.01)
(Continued)

(52) U.S. Cl.
CPC ...... *G06F 11/0772* (2013.01); *G06F 11/0745* (2013.01); *G06F 11/0751* (2013.01);
(Continued)

(58) Field of Classification Search
CPC ............. G06F 11/0766; G06F 11/0769; G06F 11/0775; G06F 11/0781; G06F 11/0784; G06F 11/321; G06F 11/322; G06F 11/326; G06F 11/327; G06F 11/0772; G06F 11/0745; G06F 11/0751; G06F 11/0793; G06F 13/4282; G06F 2213/0042; H04L 1/1635; H04L 1/1671; H04L 1/24
(Continued)

(56) References Cited

U.S. PATENT DOCUMENTS 8,185,759 B1 *   5/2012  Li .......................... G06F 3/0676
                                                       713/310
2004/0030803 A1 * 2/2004  Eatherton ......... G06F 16/90339
                                                       709/245
(Continued)

*Primary Examiner* — Sarai E Butler
(74) *Attorney, Agent, or Firm* — Winston Hsu

(57) ABSTRACT

An error handling method for a transmission interface connecting between a first device and a second device for performing data transmission between the first device and the second device, wherein a connection type between the transmission interface and the first device is a direct interface (DI) and the connection type between the transmission interface and the second device is an indirect interface (II), and the error handling method comprises: when an error is detected at the direct interface, reporting an error event to a host of the first device; when an error is detected at the indirect interface, attempting to handle the error without letting the host discover it; and when the error detected at the indirect interface is determined as unable to be solved, reporting another error event to the host.

20 Claims, 3 Drawing Sheets

(51) Int. Cl.
  *H04L 1/16*   (2006.01)
  *G06F 13/42*   (2006.01)
(52) U.S. Cl.
  CPC ...... *G06F 11/0793* (2013.01); *G06F 13/4282* (2013.01); *H04L 1/1635* (2013.01); *H04L 1/1671* (2013.01); *G06F 2213/0042* (2013.01)
(58) Field of Classification Search
  USPC ...................................................... 714/1–57
  See application file for complete search history.

(56) References Cited

U.S. PATENT DOCUMENTS

| | | | | |
|---|---|---|---|---|
| 2005/0138482 A1* | 6/2005 | Seifert | ................ | G11C 11/4125 714/42 |
| 2009/0006890 A1* | 1/2009 | Takada | ................ | G06F 11/0772 714/5.11 |
| 2009/0287722 A1* | 11/2009 | Tamura | .............. | H04N 1/32625 |
| 2011/0246833 A1* | 10/2011 | Bockhaus | ........... | H04L 43/0847 714/37 |
| 2011/0271152 A1* | 11/2011 | Hattori | ................ | G06F 11/0793 714/53 |
| 2012/0311213 A1* | 12/2012 | Bender | ................. | G06F 13/364 710/113 |
| 2013/0060987 A1* | 3/2013 | Bolen | .................... | G06F 13/00 710/316 |
| 2013/0262940 A1* | 10/2013 | Takakura | ............ | G06F 11/0766 714/57 |
| 2015/0026509 A1* | 1/2015 | Zhang | ................. | G06F 13/4059 714/6.11 |
| 2015/0293799 A1* | 10/2015 | Sekine | ............... | G06F 11/0709 714/37 |
| 2016/0142283 A1* | 5/2016 | Bennett | .................. | H04L 45/22 709/223 |
| 2016/0147705 A1* | 5/2016 | Arroyo | .............. | G06F 13/4027 714/15 |
| 2019/0278653 A1* | 9/2019 | Padilla, Jr. | ......... | G06F 11/0793 |

\* cited by examiner

ERROR HANDLING METHOD AND ASSOCIATED ERROR HANDLING ARCHITECTURE FOR TRANSMISSION INTERFACES

BACKGROUND OF THE INVENTION

1. Field of the Invention

The present invention relates to transmissions between multiple devices, more particularly, to an error handling method adopted for transmission interfaces.

2. Description of the Prior Art

Nowadays, there are more and more products having two or more high-speed interfaces, such as the Universal Serial Bus (USB), Peripheral Component Interconnect Express (PCIE), USB to Serial Advanced Technology Attachment (SATA), PCIE device to PCIE host and other transferring methods, integrated therein for convenience and practicality. Transmission between these high-speed interfaces is achieved by the control circuits that are compatible and capable of converting between two different interfaces. When no error has occurred, the transmission between these high-speed interfaces works normally. However, when any error has occurred, although these high-speed interfaces individually have their own error recovery mechanism, there is no specific way to integrate those different error recovery mechanisms, leading the command master (which can also be regarded as the upper layer or the host) to be unable to handle the error. In this manner, the program is stuck or timed out due to the lack of a proper debugging mechanism or a proper reporting mechanism, which causes great inconvenience to the user.

In summary, the current interface transmission products lack a good error recovery mechanism to integrate two or more high-speed interfaces in a single product. Therefore, there is a need for a novel error recovery mechanism to properly solve the above problems.

SUMMARY OF THE INVENTION

One objective of the invention is to provide an error handling/recovery mechanism in the high-speed transferring interface for solving the problems occurred in the prior art without introducing side effects. Through the error handling/recovery mechanism, when an error has occurred during transmission of the high-speed interface, the high-speed interface can return to the normal status and the device deadlock will not occur.

An embodiment of the invention provides an error handling method for a transmission interface connecting between a first device and a second device for performing data transmission between the first device and the second device, wherein a connection type between the transmission interface and the first device is a direct interface (DI) and the connection type between the transmission interface and the second device is an indirect interface (II), and the error handling method comprises: when an error is detected at the direct interface, reporting an error event to a host of the first device; when an error is detected at the indirect interface, attempting to handle the error without letting the host discover it; and when the error detected at the indirect interface is determined as unable to be solved, reporting another error event to the host.

Another embodiment of the invention provides an error handling architecture comprising: a first device comprising a first command interface, a second device comprising a second command interface, and a transmission interface connecting the first device and the second device and configured to perform data transmission between the first device and the second device. The transmission interface comprises a controller, a third command interface and a fourth command interface. The third command interface is connected to the first command interface to form a direct interface and the fourth command interface is connected to the second command interface to form an indirect interface. When the controller detects that an error has occurred at the direct interface, the controller is configured to report an error event to a host of the first device. When the controller detects that an error has occurred at the indirect interface, the controller is configured to attempt to handle the error without letting the host discover it. When the controller determines that the error is unable to be solved, the controller is configured to report another error event to the host.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion and should be interpreted as "include/comprise but not limited to", and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
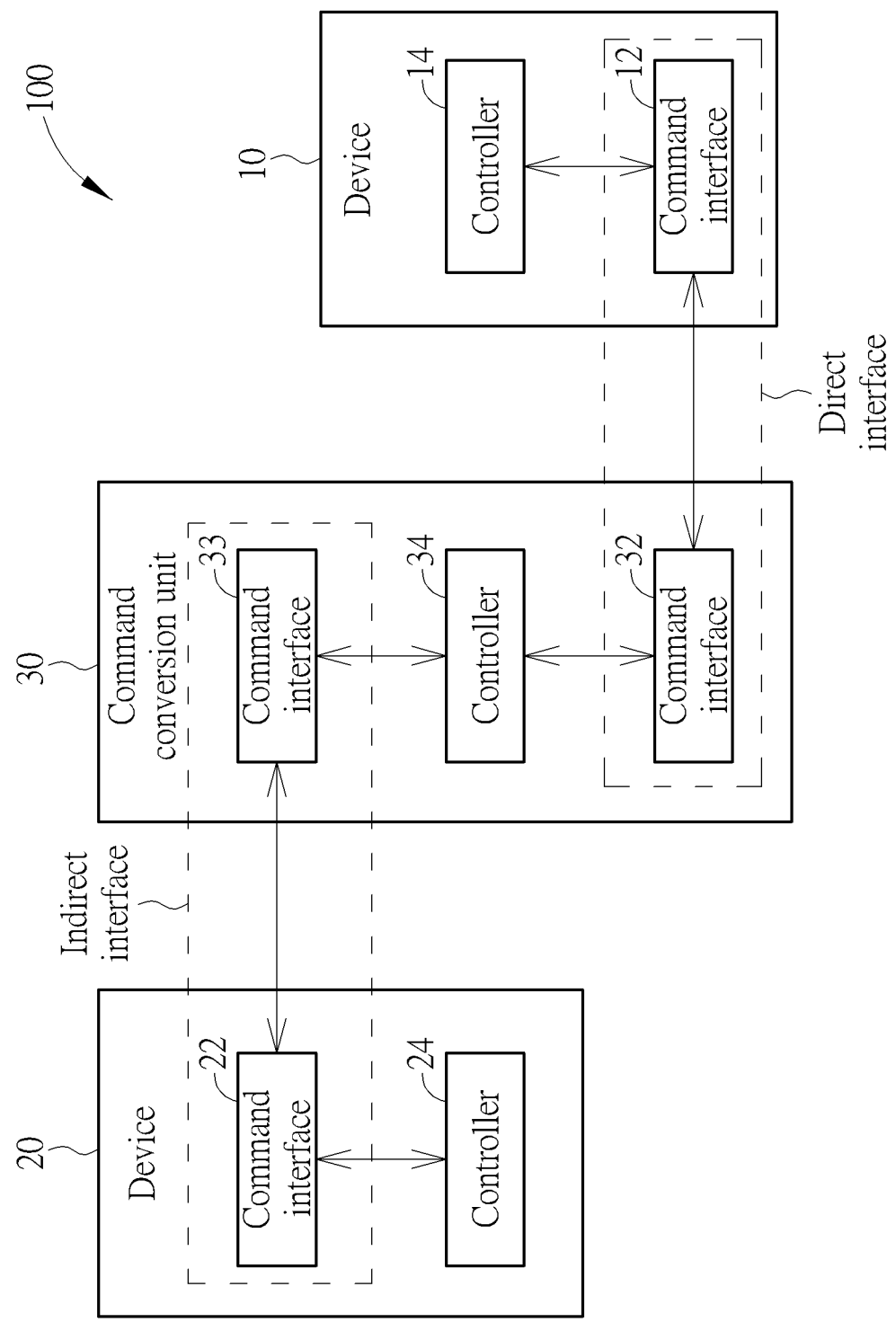
FIG. 1 is a schematic diagram of a high-speed interface transferring structure according to an embodiment of the invention.

Referring to FIG. 1, FIG. 1 is a schematic diagram of a high-speed interface transferring structure 100 according to an embodiment of the invention. As shown in FIG. 1, a command conversion unit (CCU) 30 is introduced between device 10 and device 20 for connecting the devices 10 and 20. The CCU 30 may be utilized as a direct interface for directly receiving commands. According to an embodiment of the invention, when two or more high-speed interfaces are integrated, the interface that directly receives commands may be regarded as a direct interface (DI), and the interface that indirectly receives commands may be regarded as an indirect interface (II). As shown in FIG. 1, a connection type between the command interface 12 of the device 10 and the command interface 32 of the CCU 30 is the direct interface and a connection type between the command interface 22 of the device 20 and the command interface 33 is the indirect interface. The CCU 30 further comprises a controller 34. In addition, the device 10 and the device 20 respectively comprise controllers 14 and 24. The controllers 14 and 24 are configured to perform basic data processing.

For better understanding, the device 10 may be a USB device and the device 20 may be a PCIE device, such as a hard disk drive (HDD), a solid state drive (SSD), and so on. In the conventional design, when transmission abnormality has occurred between the CCU 30 and the PCIE, since the command master (not shown) in the USB device can only detect the status at the USB device side, the command master is unable to know the abnormality occurred at the PCIE device side. In the case where the command master simply considers that there is no error occurred at the USB device side, the command master will not know how to solve the error. In this manner, the program is stuck or timed out due to the lack of a proper debugging mechanism or a proper reporting mechanism, which causes great inconvenience to the user. It should be noted that the command master can also be regarded as the upper layer or the host of the USB device.

In the embodiments of the invention, the error handling/recovery mechanism may be classified as the following cases:

A. When an error or abnormality has occurred at the direct interface, it is immediately reported to the host (that is, the command master) of the USB device and the error will be handled by the host.

B. when an error or abnormality has occurred at the indirect interface, the error will be handled by the CCU 30. The CCU 30 may attempt to or try to solve this error problem without letting the host discover it. When it is determined that the error is unable to be solved by the CCU 30, the indirect interface is configured to generate an error message and provide the error message to the direct interface, and the direct interface is configured to report this error to the host and the error will be handled by the host.

Take the embodiment shown in FIG. 1 as an example, suppose that the host in the device 10 issues a command to the CCU 30 via the direct interface, when an error is detected by the direct interface after receiving the command, this error will be directly reported to the host and the error will be handled by the host.

In another example, suppose that the host in the device 10 issues a command to the CCU 30 via the direct interface and the direct interface detects no error after receiving the command. After that, when the CCU 30 transfer the command to the indirect interface, an error is detected by the host (not shown) in the device 20 and the error is reported to the indirect interface, the CCU 30 may control the direct interface to make the host in the device 10 not feel any problem (for example, a normal status or a correct status may be reported to the host first). At the same time, the indirect interface may be configured to fix or solve the error in compliance with the specifications of the command interface 22 in the device 20. When the error detected at the indirect interface can be solved by the CCU 30 and the command interface 22, the direct interface is configured to report a normal status to the host in the device 10. On the other hand, when the error detected at the indirect interface cannot be solved by the CCU 30 and the command interface 22, the indirect interface is configured to generate an error status and the direct interface is configured to report the error status to the host in the device 10.

Figure 2:
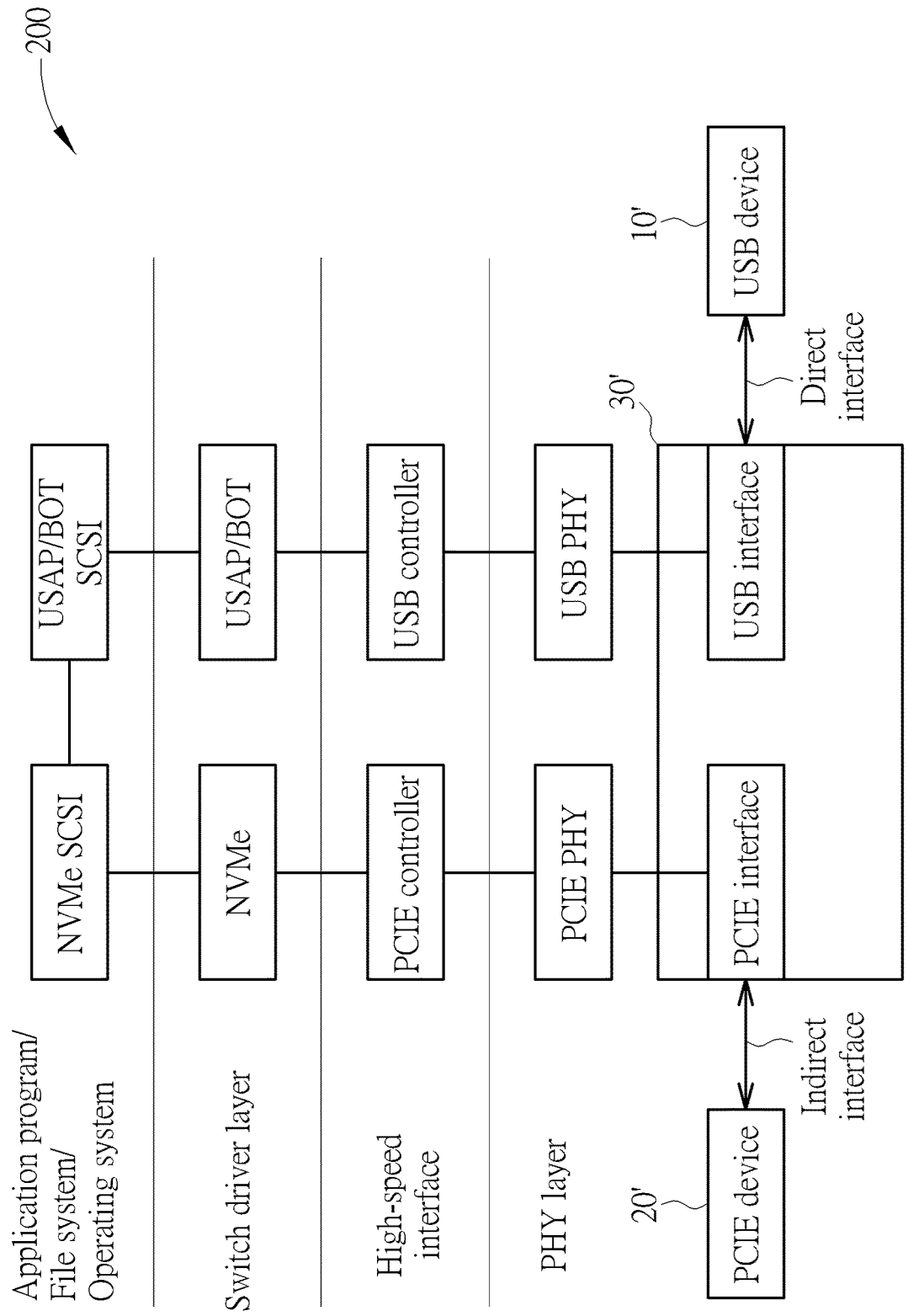
FIG. 2 is a schematic diagram showing the architecture 200 of performing transmission between the USB device and the PCIE device according to an embodiment of the invention.

Referring to FIG. 2, FIG. 2 is a schematic diagram showing the architecture 200 of performing transmission between the USB device and the PCIE device according to an embodiment of the invention. The CCU 30' may be the bridge between the USB device 10' and the PCIE device 20', and the PCIE device 20' may be the SSD (in the following paragraphs, the PCIE device 20' is directly called the SSD). The host of the USB device 10' (hereinafter called the USB host) and the CCU 30' (hereinafter called the bridge) communicate with each other via the Bulk Only Transfer (BOT)/USB Attached Small Computer System Interface (SCSI) Protocol (UASP), and the SSD and the CCU 30' communicate with each other via Non-Volatile Memory Express (NVMe)/Advanced Host Controller Interface (AHCI).

When the USB host issues an SCSI command to the SSD, the SCSI command is packaged as a USB command via the UASP/BOT and then transmitted to the USB terminal (that is, the direct interface) of the bridge. When the USB terminal receives the command, the USB terminal is configured to check whether the command complies with the UASP/BOT standards. When any error is detected, the direct interface is configured to report an error status to the USB host in compliance with the UASP/BOT standards. If the command complies with the UASP/BOT standards, the indirect interface in the bridge is configured to package this command as a PCIE command according to the NVMe/AHCI standards and transmit this command to the SSD. When any error is detected by the SSD, the SSD is configured to report an error status to the indirect interface. When the indirect interface receives the error status, the indirect interface is configured to perform error recovery in compliance with the NVMe/AHCI standards. At the same time, the bridge has to continue to make or let the USB host deem that no error has occurred. When the indirect interface is able to solve or fix the error in compliance with the NVMe/AHCI standards, the direct interface is configured to report a normal status or a correct status to the USB host. When the indirect interface is unable to solve or fix the error, the indirect interface is configured to provide an error status to the bridge and the bridge is configured to report the error status to the USB host via the direct interface for the USB host to handle this error.

In the embodiments shown in FIG. 1 and FIG. 2, the possible errors and the corresponding ways to handle the errors are illustrated in the following paragraphs (it is noted that the errors listing below are merely some examples and the invention should not be limited thereto):

A. Device not ready: In this case, the device is in busy state and is unable to process the command. The ways to handle this case comprise:

1. If the error is occurred at the direct interface, the device is configured to directly report this error status to the host for the host to know that it is not ready.

2. If the error is occurred at the indirect interface, the device is configured to wait for a period of time, under the situation where the indirect interface does not affect the direct interface, until it is able to function normally. This action can maintain the normal operation of the host.

3. If the error is occurred at the indirect interface, and the indirect interface is still unable to solve the error even after waiting for a period of time, an error status is reported to the host for the host to know that the device is not ready yet.

B. The content of the command received by the device comprises error(s) (that is, the format of the command is wrong). The ways to handle this case comprise:

1. If the error is occurred at the direct interface, the direct interface is configured to inform the host of the device which part of the command comprises error(s).

2. If the error is occurred at the indirect interface, the indirect interface is configured to inform the host of the device which part of the command comprises error(s).

C. Unsupported command: The ways to handle this case comprise:

1. If the error is occurred at the direct interface, the direct interface is configured to inform the host of the device that this command is not supported.

2. If the error is occurred at the indirect interface, the indirect interface is configured to inform the host of the device that this command is not supported.

3. If any interface (that is, any of the direct interface and the indirect interface) does not support this command, the device has to inform the host that this command is not supported.

D. The command is aborted: The device may abort the command due to some reason, for example, there is some command waiting for being processed at the power. The ways to handle this case comprise:

1. If the error is occurred at the direct interface, the direct interface is configured to inform the host of the device that this command is aborted.

2. If the error is occurred at the indirect interface, the indirect interface is configured to perform corresponding processing without affecting the direct interface, for example, the indirect interface may retry the processing of the command.

3. If the error is occurred at the indirect interface and the indirect interface is unable to solve this error even after performing the corresponding processing, the indirect interface is configured to inform the host of the device that this command is aborted via the direct interface.

E. No response from the device, for example, the device deadlock. The ways to handle this case comprise:

1. If the error is occurred at the direct interface, since there is no response from the device, it must rely on the driver of the host to recover.

2. If the error is occurred at the indirect interface, the indirect device is configured to perform corresponding processing without affecting the direct interface, for example, the indirect interface may reset.

3. If the error is occurred at the indirect interface and the indirect interface is unable to solve this error, the direct interface is configured to inform the host of the device that the device cannot respond to the command.

Figure 3:
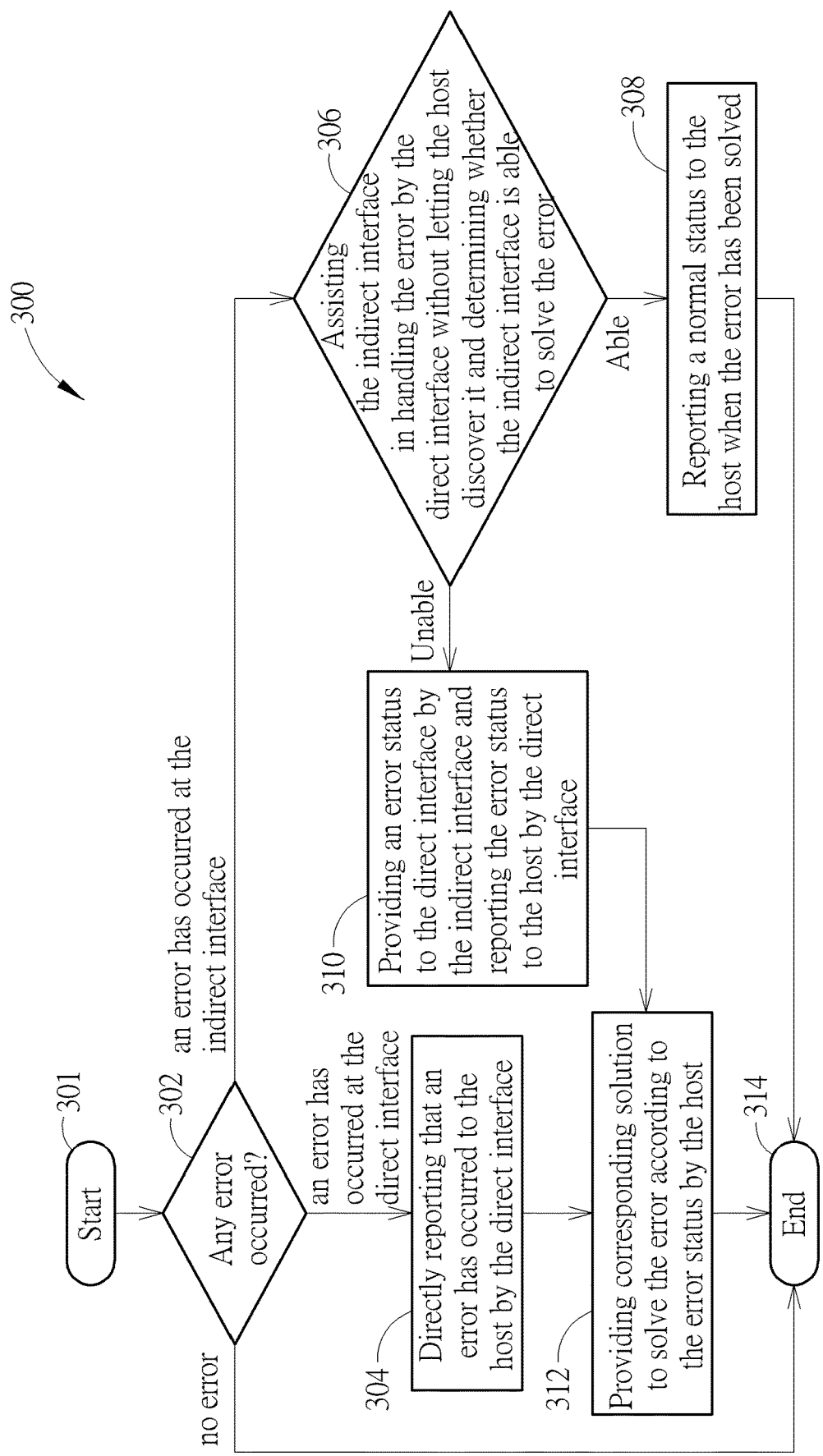
FIG. 3 is a flowchart of an error handling method 300 according to an embodiment of the invention.

Referring to FIG. 3, FIG. 3 is a flow chart of an error handling method 300 for a transmission interface according to an embodiment of the invention. If should be noted that if substantially the same result can be obtained, the steps are not necessarily performed in accordance with the execution order shown in FIG. 3. For example, some other steps can be inserted therein. The method shown in FIG. 3 may be adopted by the high-speed interface transferring structure 100 shown in FIG. 1, and comprises the following steps:

Step 301: The flow chart is started.

Step 302: Detecting whether any error has occurred at the direct interface and the indirect interface. When an error has occurred at the direct interface, step 304 is entered. When an error has occurred at the indirect interface, step 306 is entered. When no error is detected, step 314 is entered.

Step 304: Directly reporting that an error has occurred to the host by the direct interface, and then step 312 is entered.

Step 306: Assisting the indirect interface in handling the error by the direct interface without letting the host discover it and determining whether the indirect interface is able to solve the error. If the indirect interface is able to solve the error, step 308 is entered. If the indirect interface is unable to solve the error, step 310 is entered.

Step 308: When the error has been solved, reporting a normal status to the host and then step 314 is entered.

Step 310: Providing an error status to the direct interface by the indirect interface and reporting the error status to the host by the direct interface.

Step 312: Providing corresponding solution to solve the error according to the error status by the host.

Step 314: The flow chart is ended.

Since the one with ordinary skill in the art should be able to easily understand the details of each step in FIG. 3 after reading the above paragraphs, further description will be omitted here for brevity.

In summary, one objective of the invention is to improve the error handling/recovery mechanism in the high-speed transferring interface, and make the indirect interface be able to solve the error problem without letting the host discover it. However, when the indirect interface is unable to solve the error problem, the indirect interface may still report the error to the direct interface based on the current situation and the direct interface may further report the error to the host, so as to avoid the case where the host consider that the indirect interface is in a normal transmission phase, but the indirect interface actually cannot receive the data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An error handling method for a transmission interface connecting between a first device and a second device for performing data transmission between the first device and the second device, wherein a connection type between the transmission interface and the first device is a direct interface (DI) and the connection type between the transmission interface and the second device is an indirect interface (II); the error handling method applied when a host of the first device issues a command via the direct interface comprising:

when an error is detected at the direct interface, reporting an error event to the host of the first device by the transmission interface, wherein the transmission interface is a command conversion unit for directly receiving commands from the first device, packaging the commands and transmitting the commands to the second device;

when an error is detected at the indirect interface, attempting to handle the error by the transmission interface without letting the host discover it; and when the error detected at the indirect interface is determined as unable to be solved, reporting another error event to the host by the transmission interface.

2. The error handling method of claim 1, further comprising:

assisting, by the direct interface, the indirect interface in handling the error detected at the indirect interface without letting the host discover it.

3. The error handling method of claim 2, further comprising:

reporting a normal status to the host for not letting the host discover the error detected at the indirect interface.

4. The error handling method of claim 2, further comprising:

continuing, by the direct interface, to let the host deem that no error has occurred at the indirect interface when handling the error detected at the indirect interface; and when the error detected at the indirect interface has been solved by the indirect interface, reporting, by the direct interface, a normal status to the host.

5. The error handling method of claim 2, further comprising:

when the error detected at the indirect interface is determined as unable to be solved by the indirect interface in a case where the direct interface assists the indirect interface in handling the error, reporting, by the direct interface, an error status to the host.

6. The error handling method of claim 1, wherein the first device is a Universal Serial Bus (USB) device.

7. The error handling method of claim 6, wherein the direct interface is configured to perform transmission via Bulk Only Transfer (BOT)/ USB Attached Small Computer System Interface (SCSI) Protocol (UASP).

8. The error handling method of claim 1, wherein the second device is a hard disk drive (HDD).

9. The error handling method of claim 8, wherein the indirect interface is configured to perform transmission via Non-Volatile Memory Express (NVMe)/ Advanced Host Controller Interface (AHCI).

10. The error handling method of claim 1, wherein the error event and the another error event comprise at least one of the following events: device not ready, command format error, unsupported command, command aborted, and device deadlock.

11. An error handling architecture, comprising:
a first device, comprising a first command interface;
a second device, comprising a second command interface; and
a transmission interface, connecting the first device and the second device and configured to perform data transmission between the first device and the second device, wherein the transmission interface is a command conversion unit for directly receiving commands from the first device, packaging the commands and transmitting the commands to the second device, and the transmission interface comprises:
a controller;
a third command interface; and
a fourth command interface,
wherein the third command interface is connected to the first command interface to form a direct interface and the fourth command interface is connected to the second command interface to form an indirect interface, and wherein when a host of the first device issues a command via the direct interface and when the controller detects that an error has occurred at the direct interface, the controller is configured to report an error event to the host of the first device, and when the controller detects that an error has occurred at the indirect interface, the controller is configured to attempt to handle the error without letting the host discover it, and when the controller determines that the error is unable to be solved, the controller is configured to report another error event to the host.

12. The error handling architecture of claim 11, wherein the controller is configured to control the direct interface to assist the indirect interface in handling the error detected at the indirect interface without letting the host discover it.

13. The error handling architecture of claim 12, wherein the direct interface is configured to report a normal status to the host for not letting the host discover the error detected at the indirect interface.

14. The error handling architecture of claim 12, wherein the controller is configured to control the direct interface to continue to let the host deem that no error has occurred at the indirect interface when handling the error detected at the indirect interface, and when the error detected at the indirect interface has been solved by the indirect interface, the direct interface is configured to report a normal status to the host.

15. The error handling architecture of claim 12, wherein when the error detected at the indirect interface is determined as unable to be solved by the indirect interface in the case where the direct interface assists the indirect interface in handling the error, the direct interface is configured to report an error status to the host.

16. The error handling architecture of claim 11, wherein the first device is a Universal Serial Bus (USB) device.

17. The error handling architecture of claim 16, wherein the direct interface is configured to perform transmission via Bulk Only Transfer (BOT)/ USB Attached Small Computer System Interface (SCSI) Protocol (UASP).

18. The error handling architecture of claim 11, wherein the second device is a hard disk drive (HDD).

19. The error handling architecture of claim 18, wherein the indirect interface is configured to perform transmission via Non-Volatile Memory Express (NVMe)/ Advanced Host Controller Interface (AHCI).

20. The error handling architecture of claim 11, wherein the error event and the another error event comprise at least one of the following events: device not ready, command format error, unsupported command, command aborted, and device deadlock.

* * * * *